March 19, 1946.　　D. G. C. HARE ET AL　　2,397,073
RADIATION DETECTOR
Filed Nov. 2, 1940　　2 Sheets-Sheet 1
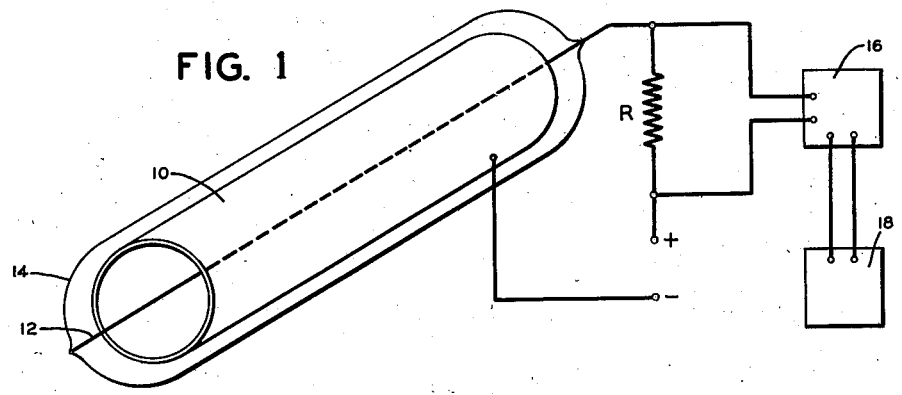
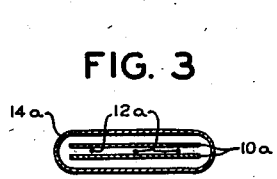
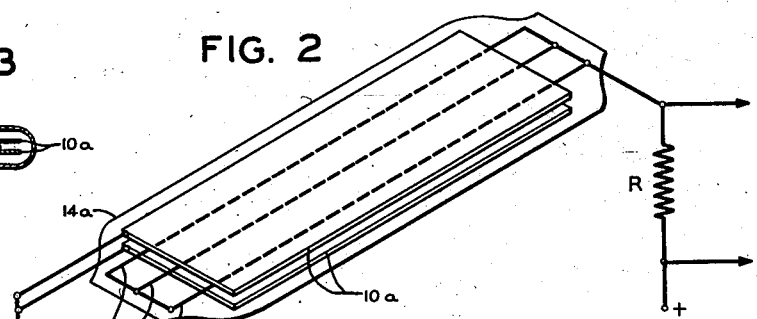
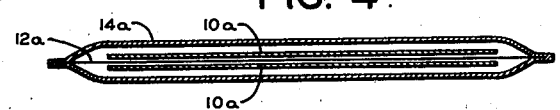
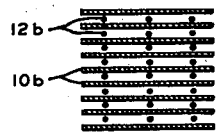
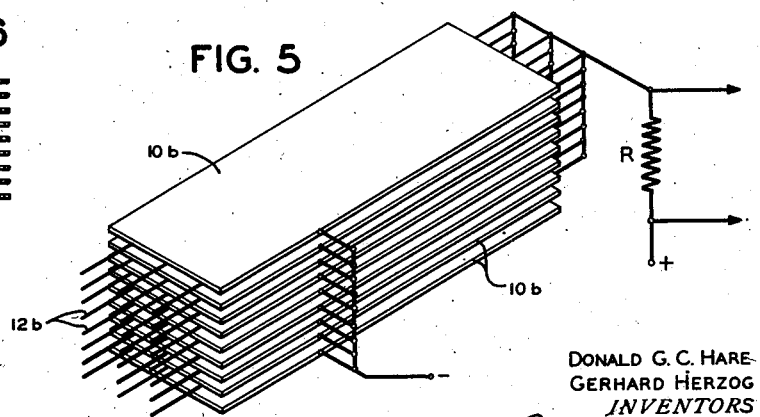
DONALD G. C. HARE
GERHARD HERZOG
INVENTORS
BY
THEIR ATTORNEYS

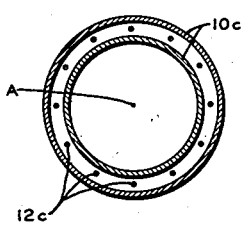
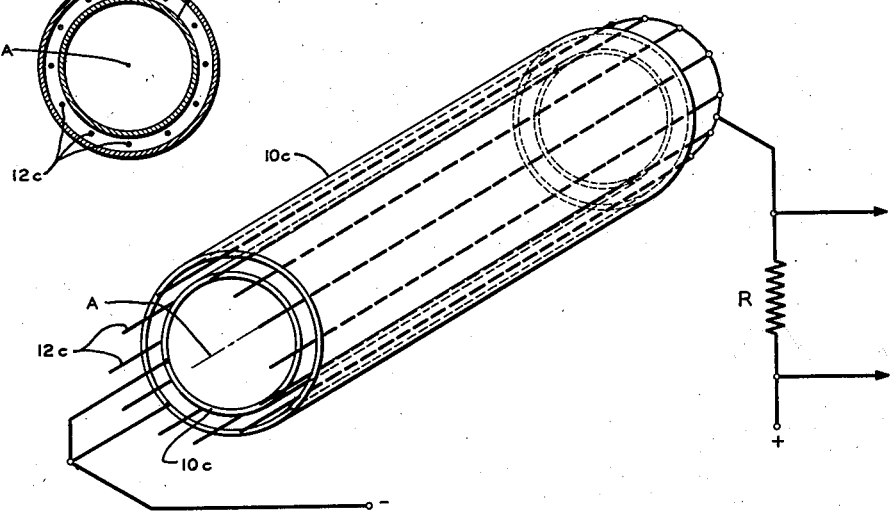
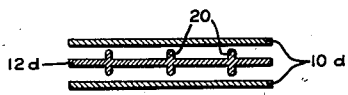
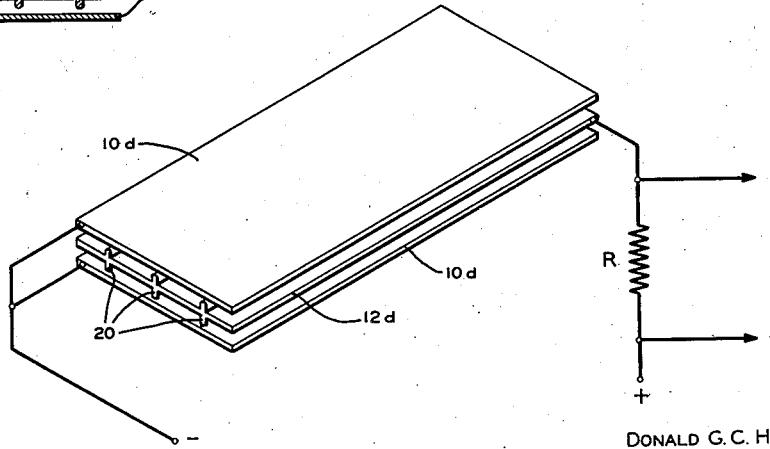

Patented Mar. 19, 1946

2,397,073

UNITED STATES PATENT OFFICE 2,397,073

RADIATION DETECTOR

Donald G. C. Hare and Gerhard Herzog, Houston, Tex., assignors, by mesne assignments, to The Texas Company, New York, N. Y., a corporation of Delaware Application November 2, 1940, Serial No. 364,020

13 Claims. (Cl. 250—83.6)

This invention relates to the detecting and measurement of radiation, and more particularly to a device of the Geiger-Muller counter type for measuring the intensity of such radiation as gamma-rays.

The principal object of this invention is to provide a device of this type having an efficiency much higher than the ordinary or conventional Geiger-Muller counter. Another object is to provide such a device which will be sufficiently rugged to be used in comparatively rough service such as in the logging of wells and bore holes where the device must be lowered through the hole to depths of many thousands of feet and which will also be reliable in operation and which will not require complicated and expensive associated equipment.

In accordance with the invention, a radiation detecting device is formed of two or more parallel plates or sheets connected together electrically to form a cathode and separated in position to form a relatively small space therebetween. In this space are disposed a plurality of fine wires comprising the anode of the device. The device is housed in an envelope of glass or other suitable material, the envelope being filled with a suitable gas. In one embodiment of the invention the anode is also formed of a plate disposed between the cathode plates, and the surfaces of the anode plate are provided with ribs or fins to cause concentration or inhomogeneity of the field. In certain cases a single plate may be used for the cathode, the anode wires being disposed in close proximity to one side of the plate.

In making intensity measurements of such radiation as gamma-rays, it is frequently desirable or necessary to use a detecting device of the Geiger-Muller counter type. This type of counter offers many advantages of ruggedness, reliability and simplicity of associated equipment, but, in common with very nearly all devices for detecting the presence of gamma-rays, it has a very low efficiency. An increase in this efficiency is very desirable, since for a given intensity of radiation the time necessary to obtain a measurement to a desired accuracy will vary directly with the efficiency. For example, for radioactive well logging, an increase in efficiency by a factor of five would allow a survey to be made at five times the present speed, or at the same speed with a much greater detail. Conversely, for measurements requiring the use of radioactive sources, such as the wall thickness measuring device disclosed in the U. S. Letter Patent of D. G. C. Hare, No. 2,277,756, issued March 31, 1942, if the efficiency is increased by five the amount of radium can be decreased to one-fifth that required at present, with consequent decreased cost and increased portability due to the smaller amount of shielding necessary.

With reference to the drawings:

Fig. 1 is a diagrammatic representation of a Geiger-Muller counter of the conventional type;

Fig. 2 is a similar representation of one embodiment of the present invention;

Figs. 3 and 4 are respectively transverse and longitudinal sections through the device of Fig. 2;

Fig. 5 is a diagrammatic representation of another form of the invention with the envelope removed;

Fig. 6 is a transverse section through the device of Fig. 5;

Fig. 7 is a diagrammatic view of another embodiment of the invention, without the glass envelope;

Fig. 8 is a transverse section through the device of Fig. 7;

Fig. 9 is a diagrammatic view of still another embodiment of the invention, the envelope being omitted for simplification; and Fig. 10 is a transverse section through the device of Fig. 9.

The conventional Geiger-Muller counter shown in Fig. 1 consists of a thin-walled metal tube 10 with a very thin wire, comprising the anode 12, spanned axially and insulated from the metal tube forming the cathode. These electrodes are enclosed in an envelope 14, commonly a glass tube, which contains a suitable gas, e. g. argon, at a fairly low pressure, say 5–10 cm. of Hg. The central wire 12 is maintained at a positive potential with respect to the cylinder, and a fairly high resistance R is placed in the circuit. Normally the potential difference between the cathode 10 and wire 12 is nearly but not quite high enough to cause a discharge to take place. If a particle capable of ionizing the gas passes through the cylinder 10, a discharge will take place with a current flow of the order of a few microamperes. This causes a large voltage drop across R and the discharge will cease after a very short period of time. By suitably amplifying the sudden voltage drop across R, as by means of an amplifying device 16, a mechanical recorder 18 or other device capable of registering the discharge of the counter may be actuated. Suitable treatment of the surface of the cylinder 10 and proper choice of the gas or gases filling the counter will cause the discharge to stop more quickly and reliably. After the discharge has ceased, the counter is again in a condition to register the passage of an ionizing particle.

Because of the large ionization per unit path length of such radiation as cosmic or beta rays, even in the relatively low density of the gas in the counter, the efficiency of the conventional counter for such rays is very nearly 100%. However, the probability of a gamma-ray causing ionization in the gas is very small, and practically all the counts due to the passage of gamma-rays are due to the electrons ejected from the cathode wall 10 by the interaction of the gamma-ray with the atoms of the cathode material. The probability of such an interaction taking place will of course increase with increasing cathode-wall thickness, but since the range in the cathode material of an electron receiving energy from the gamma-ray is seldom greater than one- or two-tenths of a millimeter, nothing is to be gained by making the wall 10 thicker than about twice the average range of the particles. At this thickness about one out of every one hundred gamma-rays traversing the cathode will eject an electron so as to "trigger" or discharge the counter. This probability or efficiency is somewhat dependent on the material used as the cathode 10 and on the amount of surface exposed, but all these factors will not cause any variation of efficiency by more than a factor of about two from that of a simple counter with the optimum wall thickness. It is to be pointed out that the efficiency is practically independent of the size of the counter, a very small counter having nearly the same optimum efficiency as a very large one.

We define the efficiency of a counter as the ratio of the number of counts to the number of rays traversing the cathode area. For a parallel beam of gamma-rays one can of course increase this ratio by using several counters, one behind the other and connected in parallel. If we have N counters, each with an efficiency E, the efficiency of the combination would be nearly NE. However, a parallel beam of gamma-rays is a practical impossibility and does not occur in nature. Another obvious way of obtaining a higher efficiency in a given counter volume is to replace the single large counter with a bundle of very small counters. It is very difficult, however, to make reliable counters of the conventional cylindrical type small enough to gain any great increase in efficiency.

If a counter were made of parallel plates with close spacing, the alternate plates being the anodes and cathodes, respectively, similar to the familiar air condenser, a very efficient unit would appear to be possible. Such counters have been discussed in the literature and have been tried out, but no success has been reported or found. For such a construction the field is probably too uniform throughout, and no cascade or multiplicative ionization will take place. However, the desired concentration or inhomogeneity of field may be attained if the alternate anode plates are replaced by a plurality of fine wires 12a, as is shown in Figs. 2, 3 and 4, where the flat cathode plates are indicated at 10a and the envelope at 14a. Such a counter has been constructed and found to operate in a very satisfactory manner, having an efficiency equal to a conventional counter whose longitudinal cross section is the same as the surface of one of the plates. A two-section counter gave twice the efficiency of the single section.

Figs. 5 and 6 show a high-efficiency eight section counter of the new type, which occupies the same volume as the conventional counter of Fig. 1, but which has nearly eight times the efficiency of the latter. The cathode plates are indicated at 10b and the anode wires at 12b. Obviously, the only restrictions on the number of stages used are those due to solid angle considerations and to mechanical and electrical difficulties encountered in the construction of sections with very small spacings. Spacings as small as 2 mm. have been found to be quite feasible and satisfactory. The number of wires per stage is governed by the spacing and plate size. In general, for a given plate size more wires are needed the smaller the spacing.

A counter embodying the principles of the present invention is not restricted to the use of flat plates. Figs. 7 and 8 show a counter of this basic design, which may also be used for analyzing small samples of radioactive substances. The sample may be placed on the axis A, at the center of the counter comprising the anode wires 12c and the cylindrical cathode plates 10c, which have been sealed in an envelope, not shown, so as to leave the axis accessible. The advantage of this construction lies in the very large solid angle included by the counter when the sample is properly disposed. More than one coaxial section may of course be used, with consequent increase in efficiency.

It has been found that it is not necessary to use wires as anodes. Figs. 9 and 10 show a counter embodying the invention in which a common anode plate 12d serves for two cathodes 10d. The necessary inhomogeneity of the field is achieved by using metal ribs or fins 20, as shown. This construction offers many obvious mechanical advantages. The counters may also be used as proportional counters, i. e., by proper choice of conditions they may be made to give a response proportional to the ionizing power of the traversing ray.

If it is desired, the various sections may be connected to separate leads which are brought out individually through the envelope seals. This would allow these various sections to be connected together externally in any desired combination, thus permitting the sensitivity of a counter to be varied. Further, by proper grouping of the various sections and connecting these groups to suitable electrical circuits, the counter may be used for various types of coincidence measurements, such, for instance, as when it is desired to determine the direction of the rays penetrating the detector. It is, of course, understood that the leads to each section referred to may be those either to the anodes or cathodes of the various sections, or one may bring out leads from both the anodes and cathodes.

Although the cathodes of the detecting device have been described as comprising plates arranged in pairs, this is not essential. The cathode may be formed of one plate with the wire or wires comprising the anode disposed adjacent in close proximity and parallel to the surface of the plate on one side or on both sides of the plate.

Obviously, many modifications and variations of the invention, as hereinbefore set forth, may be made without departing from the spirit and scope thereof, and therefore only such limitations should be imposed as are indicated in the appended claims.

We claim:

1. In a radiation detecting device of the counter type, a supporting envelope, a pair of metallic plates connected together electrically to form a cathode, said plates being disposed in separated parallel relation to provide a space therebetween, and an anode disposed in said space, said anode including means for causing concentration of the field between said anode and said cathode.

2. A device of the counter type for detecting gamma-ray radiation comprising a casing envelope, a metallic plate disposed in said envelope and forming a cathode, and a plurality of wires disposed in close proximity to said plate and connected together to form an anode.

3. In a device of the counter type for detecting gamma radiation a plurality of plates arranged in parallel and connected together electrically to form a cathode, each adjacent pair of plates being separated to form a space therebetween, and a plurality of wires arranged substantially parallel and disposed between each pair of adjacent cathode plates, all of said wires being connected together electrically to form an anode.

4. In a device for detecting gamma-ray radiation, a pair of metallic cylindrical members disposed concentrically and connected together to form a cathode, and a plurality of wires disposed substantially parallel and arranged between and insulated from said cathode members, said wires being connected together to form the anode of said device.

5. In a device for detecting gamma-ray radiation from a sample of radio-active material, a pair of metallic cylindrical members disposed concentrically and connected together to form a cathode, and a plurality of wires disposed substantially parallel and arranged between and insulated from said cathode members, said wires being connected together to form the anode of said device, said sample being adapted to be disposed on the axis of said cylindrical members.

6. In a radiation detector of the counter type, a pair of metallic plates disposed substantially in parallel and separated to provide a space therebetween, said plates being connected electrically to form the cathode of said device, a metallic anode plate disposed in the space between and parallel to said cathode plates, and projections on the surfaces of said anode plate to concentrate the field between said cathode and anode plates.

7. In a radiation detector of the counter type, a pair of metallic plates disposed substantially in parallel and separated to provide a space therebetween, said plates being connected electrically to form the cathode of said device, a metallic anode plate disposed in the space between and parallel to said cathode plates, and projections on the surfaces of said anode plate to concentrate the field between said cathode and anode plates, said projections being in the form of ribs disposed substantially parallel to each other and to said plates and projecting from the surface of said anode plate toward said cathode plates.

8. In a device for detecting gamma-ray radiation, a metallic cylindrical member forming a cathode, and a plurality of wires disposed in close proximity to the surface of said member, said wires being connected together to form the anode of the device.

9. In a device of the counter type for detecting gamma radiation a plurality of plates arranged in parallel and connected together electrically to form a cathode, each adjacent pair of plates being separated to form a space therebetween, and an anode member disposed in the space between each pair of cathode plates, each anode member comprising a plurality of wires arranged substantially parallel to each other and to said plates and the wires of each anode member being connected together electrically, said wires serving to concentrate the field between said plates.

10. In a radiation detecting device, a pair of thin metallic electrode members in the shape of surfaces of revolution, one of said members being disposed within, parallel to and spaced uniformly from the other member, said members being connected together electrically to form a cathode, and a plurality of wires disposed substantially parallel and arranged between and insulated from said electrode members, said wires being connected together to form the anode of the device.

11. A radiation detecting device comprising a housing, a plurality of metal sheets disposed in parallel, separated relation in said housing and connected together electrically to form a cathode, and a plurality of wire members disposed between and parallel to said sheets, said wire members being connected together electrically to form an anode.

12. A radiation detecting device comprising a housing, a plurality of metal sheets of similar conformation and spaced uniformly apart, said sheets being connected together electrically to form a cathode, and a plurality of wire members disposed between and parallel to said sheets, said wire members forming the anode of the device.

13. In a device of the counter type for detecting gamma radiation a plurality of plates arranged in parallel and connected together electrically to form a cathode, each adjacent pair of plates being separated to form a space therebetween, and at least one wire member disposed between and substantially parallel to each pair of adjacent cathode plates, said wire members constituting the anode of the device.

DONALD G. C. HARE.
GERHARD HERZOG.